(12) United States Patent
Utley et al.

(10) Patent No.: US 9,203,068 B2
(45) Date of Patent: Dec. 1, 2015

(54) BATTERY PACK

(71) Applicant: Ford Global Technologies, LLC, Dearborn, MI (US)

(72) Inventors: Brian Utley, Canton, MI (US); Saravanan Paramasivam, South Lyon, MI (US); Patrick Daniel Maguire, Ann Arbor, MI (US); Steven F. Chorian, Canton, MI (US); Venkateswa Anand Sankaran, Farmington Hills, MI (US); John Peter Bilezikjian, Canton, MI (US); Hari Addanki, Novi, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/253,227

(22) Filed: Apr. 15, 2014

(65) Prior Publication Data
US 2014/0205870 A1    Jul. 24, 2014

Related U.S. Application Data

(63) Continuation of application No. 13/312,323, filed on Dec. 6, 2011, now Pat. No. 9,166,215.

(51) Int. Cl.
  *H01M 2/12*    (2006.01)
  *H01M 2/10*    (2006.01)
  *H01M 2/20*    (2006.01)
  *H01M 10/625*  (2014.01)
  *H01M 10/6563* (2014.01)
  *H01M 10/6566* (2014.01)
  *H01M 10/613*  (2014.01)

(52) U.S. Cl.
  CPC .......... *H01M 2/1252* (2013.01); *H01M 2/1077* (2013.01); *H01M 2/12* (2013.01); *H01M 2/206* (2013.01); *H01M 10/613* (2015.04); *H01M 10/625* (2015.04); *H01M 10/6563* (2015.04); *H01M 10/6566* (2015.04)

(58) Field of Classification Search
  CPC ... H01M 2/1252; H01M 2/1077; H01M 2/12; H01M 2/206; H01M 10/625; H01M 10/6563; H01M 10/6566; H01M 10/613
  See application file for complete search history.

(56) References Cited

U.S. PATENT DOCUMENTS

| 4,444,853 A | 4/1984 | Halsall et al. |
| 4,613,550 A | 9/1986 | Jergl et al. |
| 2009/0017366 A1 | 1/2009 | Wood et al. |
| 2011/0274951 A1 | 11/2011 | Yasui et al. |

FOREIGN PATENT DOCUMENTS

| JP | 2009-170258 | * | 7/2009 | .............. H01M 2/10 |
| WO | WO2008/074034 | * | 6/2008 | .............. H01M 2/10 |
| WO | 2010019503 A2 | | 2/2010 | |
| WO | 2010019764 A2 | | 2/2010 | |
| WO | 2010030605 A2 | | 3/2010 | |

\* cited by examiner

*Primary Examiner* — Helen O Conley
(74) *Attorney, Agent, or Firm* — David B. Kelley; Brooks Kushman P.C.

(57) ABSTRACT

A battery pack for a vehicle may include a cell array defining an upper surface and a housing defining a raised portion extending along and above a length of the array such that the raised portion and upper surface define a vent manifold therebetween which may be configured to collect gases generated by the array. The housing may define a discharge opening configured to allow gases to exit the manifold. A pair of end plates may be disposed at opposing ends of the array. One of the end plates may define a pass through portion in at least partial registration with the discharge opening. An outlet tube may be configured to facilitate fluid communication between the vent manifold and exterior of the vehicle. The battery pack may also include spacers located between upper edges of adjacent cells and may be configured to prevent cooling gases from entering the vent manifold.

18 Claims, 3 Drawing Sheets

BATTERY PACK

CROSS-REFERENCE TO RELATED APPLICATION

This application is a continuation of application Ser. No. 13/312,323, filed Dec. 6, 2011, now U.S. Pat. No. 9,166,215, issued Oct. 20, 2015, the disclosure of which is hereby incorporated in its entirety be reference herein.

TECHNICAL FIELD

The invention relates to battery packs of the type used in motor vehicles powered by a high-voltage electric motor.

BACKGROUND

Depending on its type—e.g., the chemical reactions involved—a power supply such as a battery cell or a battery pack may emit a certain amount of gas during its working life. Providing a ventilation system to allow such byproduct gasses to escape the power supply may be desirable in certain applications, such as when a battery pack is used in a vehicle. To vent battery cells and battery packs carried aboard a wheeled motor vehicle (such as a car, truck, van, SUV, construction vehicle, etc.), an elaborate system may be required to capture the byproduct gases and exhaust them out of the vehicle. Adding to this design challenge is that, in a system of multiple cells in a stack or array, the tolerance stack-up of the cells with its neighboring cells may make it difficult to provide robust sealing for a byproduct gas venting system.

Many battery packs require a cooling system to maintain proper system operation over the expected range of operating conditions and temperatures. In motor vehicles, cooling is commonly achieved by providing a flow of air through the pack so that it passes over/around the individual cells. The air may be drawn from the interior and/or the exterior of the vehicle, and may likewise be exhausted to the interior and/or exterior of the vehicle. If the battery pack cooling gas is exhausted into the vehicle interior, it is generally desirable for any byproduct gasses that may be emitted by the battery cells to be kept separate from the cooling gas stream so that the byproduct gasses do not enter the passenger compartment.

SUMMARY

A battery pack includes a plurality of interleaved cells and spacers arranged to form a stack having a vent side on which each of the cells has a vent port. The battery pack also includes a pair of end plates disposed at opposing ends of the stack and a plurality of rails spanning between the end plates. The end plates and rails are configured to support and retain the stack. The battery pack also includes a cover including a wall spaced away from the vent side of the stack. The cover is sealed with the end plates and at least some of the rails such that the vent side of the stack, the end plates and the wall form a vent manifold adjacent to the vent side to receive vent gases from the cells. The pair of end plates may each include a surface defining a pass through opening. The vent manifold may be configured to direct the vent gases through the pass through openings of the end plates. An outlet tube may be secured to one of the end plates and at least in partial registration with the respective pass through opening and the outlet tube may be configured to deliver fluid from the vent manifold to an exterior of a vehicle including the battery pack. The vent manifold may be further configured to contain the vent gases. The spacers may define one or more extensions located between upper edges of adjacent cells and may be configured to prevent cooling gases from entering the vent manifold. The spacers may define one or more extensions located between upper edges of adjacent cells and may be configured to prevent vent gases from entering a cabin of a vehicle including the battery pack.

A battery pack for a vehicle includes a cell array defining an upper surface and a housing defining a raised portion extending along and above a length of the array such that the raised portion and upper surface define a vent manifold therebetween configured to collect gases generated by the array. The housing also defines a discharge opening configured to allow gases to exit the manifold. The vent manifold may be further configured to contain the gases generated by the array. The battery pack may also include a pair of end plates disposed at opposing ends of the array. One of the end plates may define a pass through portion in at least partial registration with the discharge opening. The battery pack may also include a pair of rails arranged with the end plates to retain the cells therebetween. The rails and endplates may be configured to contact the housing and seal the vent manifold therebetween. The housing and the rails may be further configured to generate a compression force at the contact therebetween. The battery pack may also include an outlet tube configured to facilitate fluid communication between the vent manifold and exterior of the vehicle. The battery pack may also include spacers located between upper edges of adjacent cells and may be configured to prevent cooling gases from entering the vent manifold. The housing may further define the discharge opening such that gases exit the manifold when a pressure of the gases exceeds a predefined level.

A battery pack assembly includes a battery cell array including a plurality of battery cells each defining a vent hole located on portions of the cells that define an upper surface of the array. The battery pack also includes a pair of end plates, at least one of which defines a pass through opening. The battery pack also includes inner and outer support rails arranged with the end plates to retain the cells therebetween and a cover. The cover defines a raised portion extending along a length of the array and above the upper surface, a center portion configured to contact the inner support rail, an outboard portion configured to contact the outer support rail, and a discharge opening. The cover portions and rails are arranged to define a sealed chamber therebetween such that gases exiting the vent holes pass through the chamber en route to the pass through opening and discharge opening. The center portion, outboard portion, and the rails may be further configured to generate a compression force at the contact therebetween. The battery pack may also include an outlet tube secured about the discharge opening and configured for fluid communication with an exterior of the vehicle. The pass through opening and discharge opening may be in at least partial registration with one another. The chamber may be further configured to contain the gases exiting the cells.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
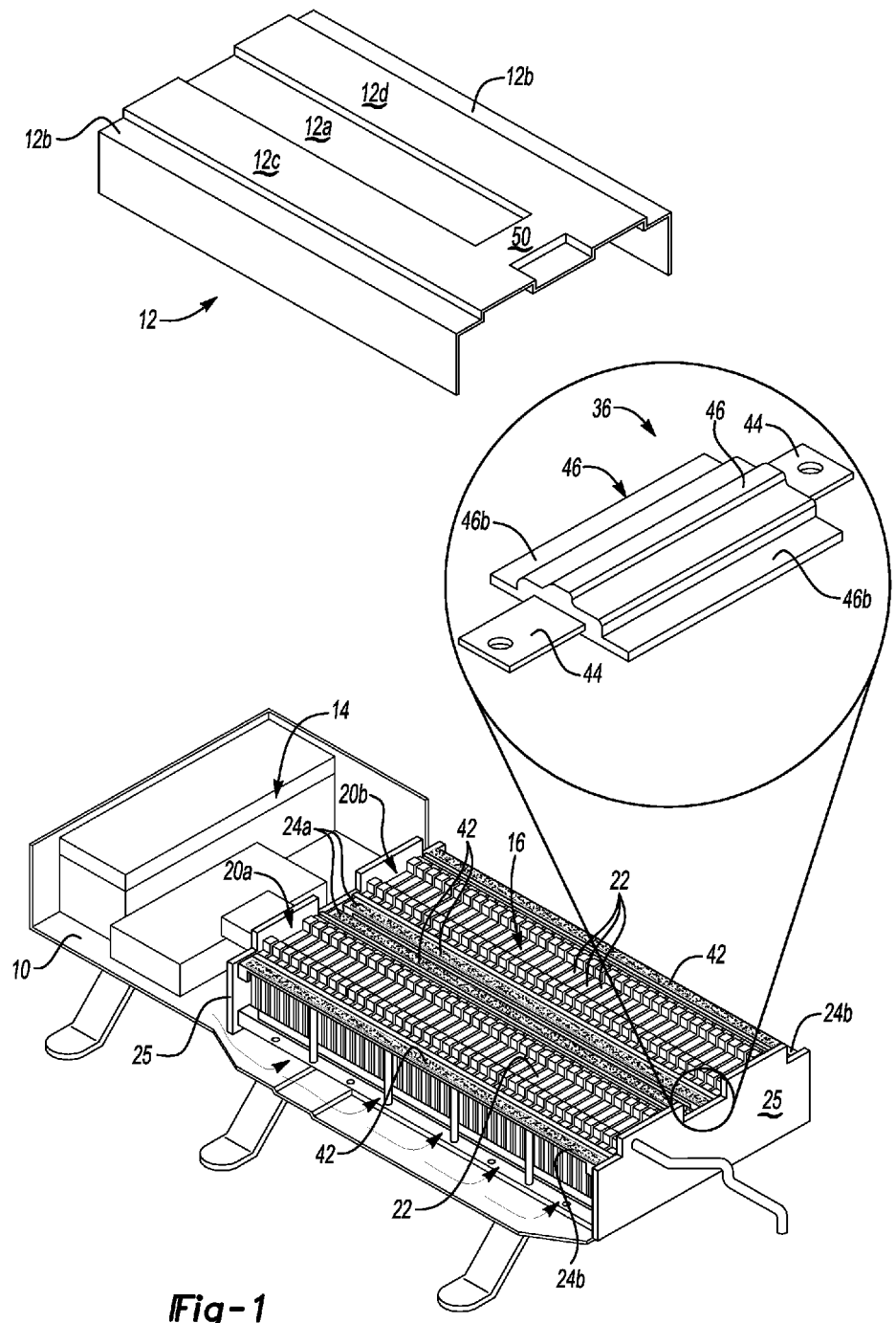
FIG. 1 is a perspective, partially exploded view of a battery pack in accordance with a disclosed embodiments.

As shown in FIG. 1, a battery pack in accordance with an embodiment of the invention includes a housing made up of a base 10 and a cover 12 that is shown removed to expose the interior of the battery pack. The battery pack interior may be divided into an electronics section 14 and a battery cell section 16. The battery pack is adapted for use in an automotive vehicle.

Figure 3:
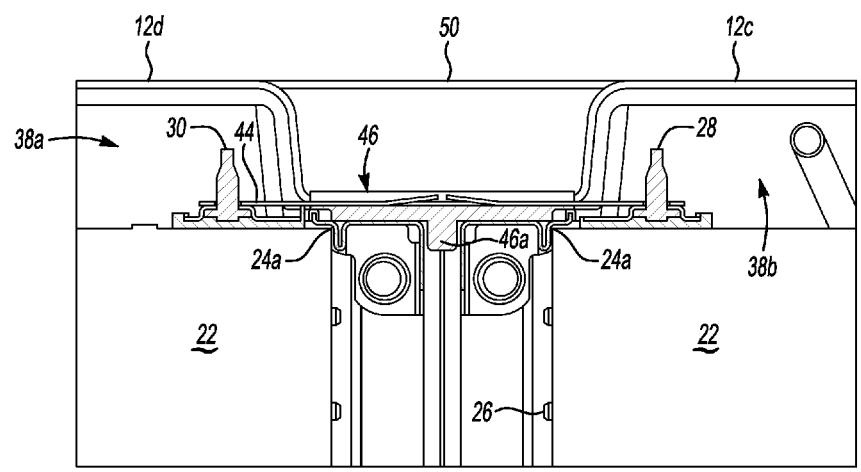
FIG. 3 is a cross-sectional view showing additional features of the bridging bar and installation of FIG. 2.

Battery cell section 16 includes two generally parallel arrays 20a, 20b each of which comprises a plurality of voltaic cells 22. The voltaic cells 22 of each array 20a, 20b are supported in a linear arrangement by a chassis which may, for example, comprise inner and outer support rails 24a, 24b connected at either end to end plates 25. Spacers 26 (best seen in FIG. 3) may be located between adjacent voltaic cells 22 to allow a flow of cooling gas, usually ambient air, to pass. Spacers 26 may be integrated with the voltaic cells 22 or may be separate components assembled to the cells when the arrays are built up. Spacers 26 may also be utilized as and/or combined with mounting brackets to retain cells 22 in position relative to support rails 24a, 24b and to adjacent cells.

Seals are provided between the upper edges of adjacent pair of cells 22 within each array. In the depicted embodiment, portions of spacers 26 adjacent the upper edges of cells 22 act as seal.

When cover 12 is fastened to base 10 to enclose battery cell section 16, a center portion 12a of the cover seals against the top surfaces of inner support rails 24a. In a similar fashion, outboard portions 12b of the cover seal against the top surfaces of outer support rails 24b. These four linear seals combine with the seals between the upper edges of adjacent cells 22 to form a sealed cooling chamber below the upper surfaces of the two arrays 20a, 20b. Clearance is provided between the side walls of cover 12 and the outboard edges of cells 22 (beneath outer rails 24b) so that cooling gas is able to flow generally horizontally between cells.

The surfaces of cells 22 that face one another within each array (the vertical surfaces as viewed in the present figures) are adapted to enable heat transfer between the cells and the cooling gas, as is well known in the art. In FIG. 1, flow arrows F indicate a possible direction of the cooling flow. One or more fans or other gas movement devices (not shown) may be provided to force cooling gas through the battery pack, and/or ram air from movement of the vehicle may be used to induce the cooling flow. If air is used as the cooling gas, the air may come from exterior to the vehicle and/or from within the interior of the vehicle. Some or all of the cooling gas exiting the battery pack may be returned to the vehicle interior for climate control purposes, and/or some may be exhausted exterior of the vehicle.

Cover 12 further comprises two raised portions 12c, 12d located directly above the respective arrays 20a, 20b when the cover is attached to base 10. Raised portions 12c, 12d sealingly cover the upper surfaces of arrays 20a, 20b to define a pair of vent chambers or manifolds 38a, 38b (see FIG. 2) extending along and above the length of the respective arrays. Since vent holes 32 are located in/on the portions of cells 22 that form the upper surfaces of arrays 20a, 20b, any byproduct gasses issuing from the vent holes will be contained by vent manifolds 38a, 38b.

Figure 2:
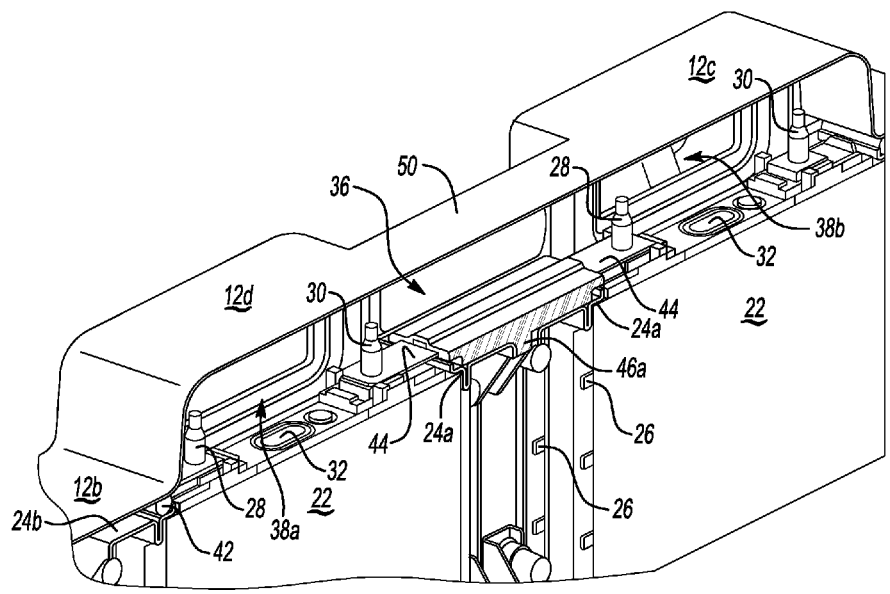
FIG. 2 is a perspective section view of the battery pack of FIG. 1, showing the installation of a bridging bar joining the two arrays of the battery pack.

As best seen in FIG. 2, each voltaic cell 22 has a positive terminal 28, a negative terminal 30, and a vent hole 32. Busbars, wires, or other electrically conductive connectors (not shown) interconnect the appropriate terminals of adjacent battery cells 22 so that the cells within each array 20a, 20b are connected in electrical series, as is well known in the art.

In addition to connecting the cells within each array 20a, 20b in series, it may be necessary for the two arrays to be connected in series to achieve a desired voltage level for the battery pack. In this case, a terminal of a cell in array 20a is connected with a terminal of a cell in the other array 20b having the appropriate (opposite) polarity. This connection may be made by a bridge bar 36 extending between the inboard terminal (closest to the center-line of battery pack dividing the two arrays) at the extreme end of first array 20a, and the adjacent inboard terminal of array 20b.

During some abnormal operating conditions, such as overheating, the voltaic cells 22 may generate a gaseous byproduct. To prevent an undesirable pressure buildup within the cells, any such byproduct gases are allowed to escape from the cells through vent holes 32. It is generally desirable that any byproduct gases be exhausted outside of the vehicle rather than being allowed to enter the interior of the vehicle. If the cooling gas circulating through the battery arrays is returned to the vehicle interior, as is commonly the case, this dictates that the byproduct gases must be kept separate from the cooling gas flow. This may be achieved by providing gas-proof seals at appropriate locations in the vicinity of the tops of the cells 22 so that the cooling gas is kept below the upper surface of battery arrays 20a, 20b and a separate manifold is defined above the arrays for collecting any byproduct gases issuing from vent holes 32.

Center section 12a of the cover seals against the top surfaces of inner support rails 24a when the cover is attached to base 10. In a similar fashion, outboard portions 12b of the cover seal against the top surfaces of outer support rails 24b. Raised portions 12c, 12d are located directly above the respective arrays 20a, 20b and define first and second vent manifolds 38a, 38b (see FIG. 2) extending along the length of the respective arrays above the voltaic cells 22 to receive any byproduct gasses issuing from vent holes 32. A tunnel 50 extends between raised portions 12c, 12d and connects the first and second manifolds 38a, 38b. Seals or gaskets 42 may be provided at appropriate locations between cover 12, support rails 24a, 24b and end plates 25 as necessary to substantially seal the interior of battery pack from its environment.

A bridge bar 36 connects terminal 28 of the end-most cell in array 20a with terminal 30 of the adjacent cell in array 20b. Bridge bar 36 comprises a conductive bar 44 (preferably made from copper, aluminum, or other material having good electrical conductivity) and a sealing portion 46 covering the central portion of the conductive bar. Sealing portion 46 may completely surround the center section of conductive bar 44, as shown, or it may be disposed only at locations where sealing contact is required. Bridge bar 36 may be secured to terminals 28, 30 by clips or nuts (not shown) which fit over the top of the terminals. When in the bridging position, sealing portion 46 covers any gap that may exist between inner support rails 24a and may have a rib 46a projecting downwardly into the gap as shown in FIG. 4.

Sealing portion 46 is preferably made of a resilient material that will achieve an effective gas seal when compressed, such as a polymer or synthetic rubber. Sealing portion 46 may be efficiently formed around the conductive bar 44 by an over-molding process.

Tunnel 50 is located on cover 12 so as to be positioned over bridge bar 36 to provide clearance for the bar, and also provides a passage through which any gases collecting in first manifold portion 38a may flow into the second manifold portion 38b. Tunnel 50 may be formed as a part of (integrally with) cover 12, as a single sheet metal stamping or molded plastic part, for example. Alternatively, tunnel 50 may be fabricated as a separate piece and assembled to cover 12 by welding, adhesive, or a joining technique appropriate for the materials used.

Figure 4:
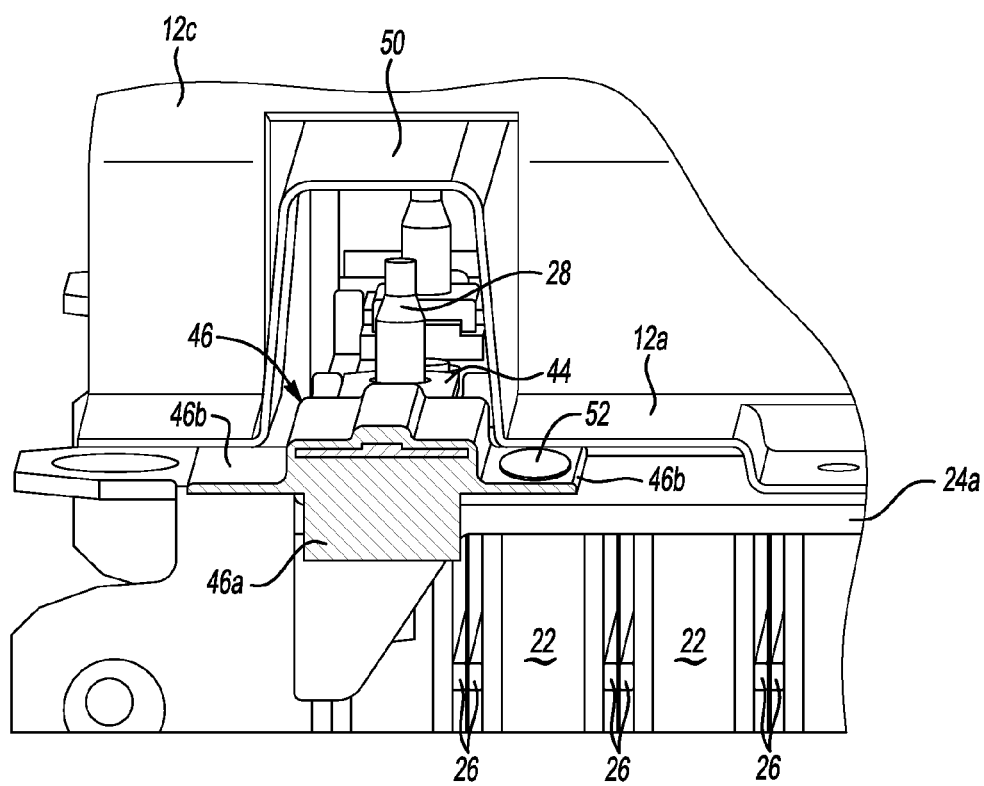
FIG. 4 is another cross-sectional view of the bridging bar installation of FIGS. 2 and 3.

As best seen in FIG. 4, bridge bar sealing portion 46 has flanges 46b extending outward from conductive bar 44. Flanges 46b span a width greater than the width of tunnel 50 so that the sealing portion effectively seals off the tunnel from the cooling gas chamber below. Extra seals may be provided, if necessary, in the vicinity of sealing portion 46, for example, a bead seal 52 disposed above flange 46b as shown in FIG. 4.

A vent outlet tube 54 communicates with vent manifold 38b so that any byproduct gases generated by the cells of either array 20a, 20b can escape and prevent an undesirable pressure increase inside battery pack. The gases are preferably vented outside of the vehicle via outlet tube 54.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery pack comprising:
   a plurality of interleaved cells and spacers arranged to form a stack having a vent side, and each of the cells having a vent port and two terminals on a same side of the cell;
   a pair of end plates disposed at opposing ends of the stack;
   an inner rail and an outer rail spaced apart from one another, located at opposing sides of the cells, and spanning between the end plates, wherein the end plates and rails are configured to support and retain the stack; and
   a cover defining a raised portion spaced away from the vent side of the stack, a center portion sealed against the inner rail, and an outboard portion sealed against the outer rail, wherein the cover is gas sealed with the end plates and the inner and outer rails such that the vent side of the stack, the end plates and the raised portion form a vent manifold adjacent to the vent side to receive vent gases from the cells.

2. The battery pack of claim 1, wherein the pair of end plates each include a surface defining a pass through opening.

3. The battery pack of claim 2, wherein the vent manifold is configured to direct the vent gases through the pass through openings of the end plates.

4. The battery pack of claim 3, further comprising an outlet tube secured to one of the end plates and at least in partial registration with the respective pass through opening, wherein the outlet tube is configured to deliver fluid from the vent manifold to an exterior of a vehicle including the battery pack.

5. The battery pack of claim 1, wherein the vent manifold is further configured to contain the vent gases.

6. The battery pack of claim 1, wherein the spacers define one or more extensions located between upper edges of adjacent cells and are configured to prevent cooling gases from entering the vent manifold.

7. The battery pack of claim 1, wherein the spacers define one or more extensions located between upper edges of adjacent cells and are configured to prevent vent gases from entering a cabin of a vehicle including the battery pack.

8. A vehicle battery pack comprising:
   an array of cells each having terminals and a vent port on a same side;
   inboard and outboard rails extending along opposing corners of the cells; and
   a housing defining a raised portion extending along and above the array such that the raised portion, rails, and sides define a gas-sealed vent manifold to contain gases generated by the array and an opening configured to allow gases to exit the manifold.

9. The pack of claim 8, further comprising a pair of end plates disposed at opposing ends of the array and wherein one of the end plates defines a pass through portion in at least partial registration with the opening.

10. The pack of claim 9, further comprising a pair of rails arranged with the end plates to retain the cells therebetween, wherein the rails and endplates are configured to contact the housing and seal the vent manifold therebetween.

11. The pack of claim 10, wherein the housing and the rails are further configured to generate a compression force at the contact therebetween.

12. The pack of claim 8, further comprising an outlet tube configured to facilitate fluid communication between the vent manifold and exterior of the vehicle.

13. The pack of claim 8, wherein the housing further defines the opening such that gases exit the manifold when a pressure of the gases exceeds a predefined level.

14. A battery pack assembly for a vehicle comprising:
   a battery cell array including a plurality of battery cells each defining a vent hole and two terminals located on a side of the cell and such that the sides of the cells at least partially define an upper surface of the array;
   a pair of end plates, at least one of which defines a pass through opening;
   inner and outer support rails arranged with the end plates to retain the cells therebetween, wherein the outer support rail extends along corners of the battery cells; and
   a cover defining a raised portion extending along a length of the array and above the upper surface, a center portion configured to contact the inner support rail, an outboard portion configured to contact the outer support rail, and a discharge opening, wherein the cover portions and rails are arranged to define a gas sealed chamber therebetween such that gases exiting the vent holes pass through the chamber en route to the pass through opening and discharge opening.

15. The pack of claim 14, wherein the center portion, outboard portion, and the rails are further configured to generate a compression force at a location of the contacts.

16. The pack of claim 14, further comprising an outlet tube secured about the discharge opening and configured for fluid communication with an exterior of the vehicle.

17. The pack of claim 14, wherein the pass through opening and discharge opening are in at least partial registration with one another.

18. The pack of claim 14, wherein the chamber is further configured to contain the gases exiting the cells.

* * * * *